March 31, 1970   F. BARBIERI   3,503,531
APPARATUS FOR PROTECTING COMPONENTS OF WORK PERFORMING VEHICLES
Filed May 27, 1968   2 Sheets-Sheet 1

INVENTOR.
FRANK BARBIERI
BY
ATTORNEYS

March 31, 1970  F. BARBIERI  3,503,531
APPARATUS FOR PROTECTING COMPONENTS OF WORK PERFORMING VEHICLES
Filed May 27, 1968  2 Sheets-Sheet 2

INVENTOR.
FRANK BARBIERI
BY Friedman & Goodman

ATTORNEYS

United States Patent Office 3,503,531
Patented Mar. 31, 1970

3,503,531
APPARATUS FOR PROTECTING COMPONENTS
OF WORK PERFORMING VEHICLES
Frank Barbieri, 62 Alabama St.,
Long Beach, N.Y. 11561
Filed May 27, 1968, Ser. No. 732,252
Int. Cl. B65f 3/06; B60k 25/04
U.S. Cl. 214—83.3                    2 Claims

ABSTRACT OF THE DISCLOSURE

An improvement in a vehicle equipped with an air actuated power take-off unit wherein means are provided to prevent improper actuation of the power take-off unit or related converter assembly and to insure that the work performed by the vehicle is done by the proper sequence of steps. A device for use on a garbage truck to insure that the compacting element is not improperly actuated when the assembly is disengaged from abutment against the garbage truck body. A device in association with the air lines feeding the power take-off unit for limiting the engine cycle speed of the vehicle by engagement with the carburetor linkage system.

BACKGROUND OF THE INVENTION

Field of the invention

This invention relates to safety devices for use in trucks and other motorized equipment. More particularly, this invention relates to means for regulating the various cycles of trucks equipped with hydraulically operated power take-off units whereby use of the means prevents damage to the truck due to human error. Still more particularly, in a preferred embodiment this invention relates to a control system for a garbage truck equipped with a rearwardly disposed compacting unit.

Discussion of the prior art

The problems in operating trucks equipped with power take-off units which actuate other means associated with the truck to perform a given function are exemplified in the garbage truck. Presently the garbage truck is operated using power from the truck which services the power take-off unit. The driver approaches the place where the garbage is located, stops the truck, engages the power take-off unit while it is in drive position to begin the garbage compaction function. At this point he must pull the lever to operate the four wheel truck service brake and thereafter immediately shift into neutral. If the power take-off unit is engaged while in neutral it is not operable but substantial damage can be visited upon the converter assembly off which the power take-off unit operates. If the truck is permitted to stay in drive with the power take-off unit engaged, substantial damage can occur to the converter assembly. Thus, it is critical to operate the garbage compaction cycle in just the precise way indicated above to avoid damage to the truck and its expensive components. Since these components function also in the normal driving operation of the truck as well as the work function, damage to them renders the truck unsafe for use.

When the compaction cycle is complete, it is likewise critical to end the cycle by first switching from neutral to drive immediately after the compaction and disengage the air-actuated power take-off unit shortly thereafter. If the power take-off unit is not shortly disengaged after the truck is in drive the truck components will be damaged. On the other hand, if the power take-off unit is disengaged while the truck is in neutral the converter assembly will be damaged.

A related problem in the maintenance of garbage trucks equipped with rearwardly disposed compacting elements such as described in U.S. Patent 2,703,184 to E. R. Barrett of Mar. 1, 1955, entitled "Refuse Truck," concerns itself with operation of the compacting element while the latch at the bottom of the truck has been disengaged either by inadvertence or intentional to pack more garbage into the truck than it was meant to carry. This severely damages the compacting blade causing costly repairs.

SUMMARY OF THE INVENTION

Objects of the invention

It is an object of this invention, therefore, to provide means in association with a truck equipped with a power take-off unit to prevent damage to the truck transmission and converter assembly by improper use.

It is another object of this invention, therefore, to provide means for preventing the power take-off unit from engaging when the truck is in neutral.

It is another object of this invention, therefore, to provide means for preventing the truck to remain running in drive position after the power take-off unit has been engaged a substantial period of time.

It is still another object of this invention to prevent a truck from running if the power take-off unit is disengaged while the truck is in neutral.

It is yet another object of this invention to prevent the truck from running for a substantial period of time after it has been shifted into drive position with the power take-off unit still engaged.

It is another feature of the invention to provide means actuated substantially simultaneously with the power take-off unit which prevent the truck engine cycle speed from being increased to increase the rate at which the work unit performs beyond the manufacturer's allotted tolerances.

Still another feature of the invention is to provide means associated with the truck which prevent garbage compaction when the latch holding the compaction unit to the truck has become disengaged where such compaction would damage the compaction assembly.

These and other objects and advantages will become apparent from the following description, accompanying drawings and appended claims.

STATEMENT OF THE INVENTION

Broadly, this invention contemplates an improvement in a vehicle equipped with an air-actuated power take-off unit which comprises means for engaging said power takeoff unit including three-way off-on-off electrical switch, electrical switch means associated with the transmission of said truck and electrical relay means comprising a time delay circuit and a second circuit, said electrical relay means in electrical association with the negative pole of the coil of said vehicle, an air-actuated electrical switch in the air line to said power take-off unit, said electrical switch means associated with the transmission comprising a pair of transmission switches, the first transmission switch of which is closed only when said vehicle is in drive position and the second transmission switch of which is closed only when said truck is in neutral, said second transmission switch and said three-way off-on-off switch in electrical combination with said second circuit, said first transmission switch and aid three-way off-on-off switch in trical combination with said time delay circuit, and a source of electrical current in the circuits.

In a particularly desirable embodiment of the invention an air-actuated piston is positioned off the air lines in said truck and said piston is connected to an arm having an elongated slot therein through which passes a member of the carburetor linkage system of said vehicle whereby actuation of said piston limits the ability of said engine from running at a greater engine cycle speed than a predetermined cycle speed.

In still another desirable embodiment of this invention, the invention contemplates a pair of switches mounted between the junction of the compacting element on a garbage truck and the truck body itself, one of said switches mounted proximate the pivot means connecting said compacting element with said truck body and the other mounted just above the lowermost point at which said compacting element normally abuts said truck body, the uppermost switch normally closed and the lowermost switch normally open, said switches normally held in the normal positions by abuttment of said compacting element against said switches, said switches in series with one another and in electrical combination with aid time delay circuit.

BRIEF DESCRIPTION OF THE DRAWINGS

The invention can be more readily understood and appreciated by reference to the accompanying drawings, in which.

DESCRIPTION OF PREFERRED EMBODIMENTS

Figure 1:
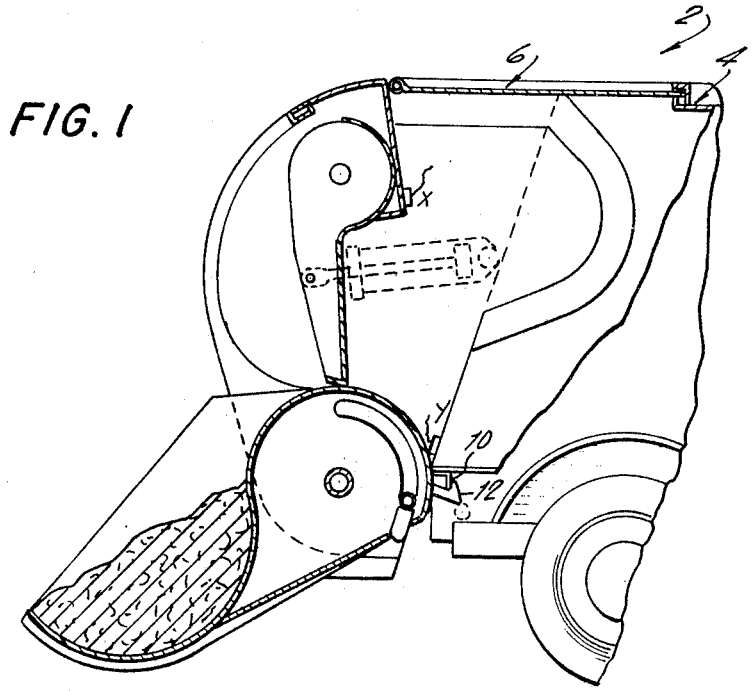
FIGURE 1 is a side view of the rearward portion of a garbage truck provided with a rearwardly disposed compacting assembly.

A preferred embodiment of the present invention is illustrated in FIGS. 1–7 wherein the device is shown for use on a garbage truck. It is to be understood that it is capable of use on any truck or transmission equipped vehicle having an air-actuated power take-off unit. In the embodiment shown, the rearward portion of the garbage truck 2 comprises a garbage receptacle 4 to which is attached a compacting assembly 6 such as that shown in U.S. Patent 2,703,184. Positioned against the truck itself, as shown in FIG. 1, is an L-shaped seal 10 which is engaged by a hook 12 permanently and pivotally connected to the bottom portion of the compacting assembly 6. During operation the latch is closed but is disengaged when the compacted garbage is emptied from the truck as more fully described below.

Figures 2, 3:
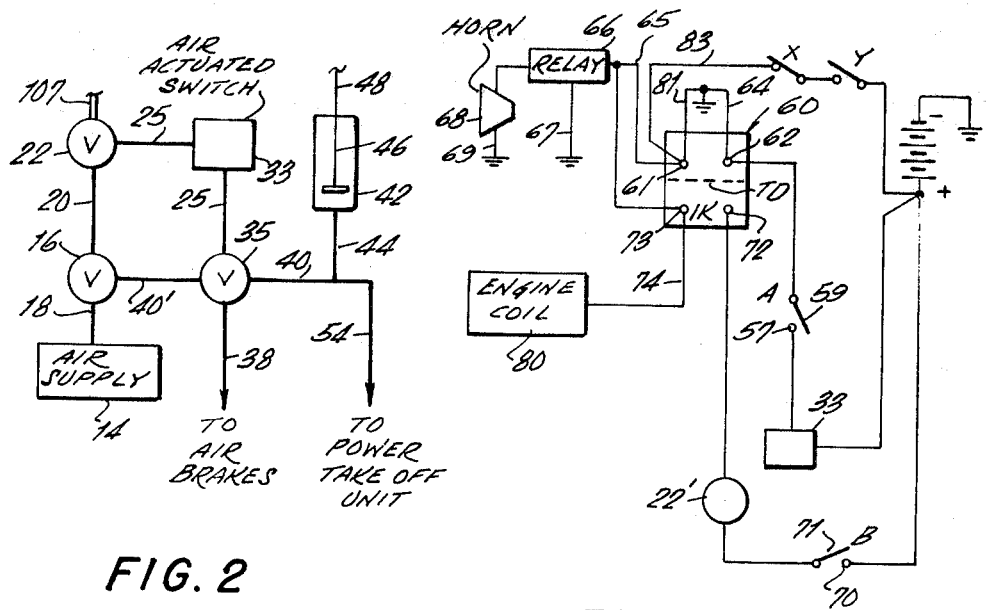
FIGURE 2 is a schematic drawing of the air hydraulic system of a truck provided with the present invention.
FIGURE 3 is a schematic drawing of the electrical circuitry associated with the present invention.

The truck is provided with an air hydraulic system which is shown in FIG. 2 schematically. An air supply 14 feeds into a foot brake treadle valve 16 through line 18. This treadle valve is actuated by the foot brake of the truck to engage the truck service brakes when the brake pedal is depressed. An air line 20 is connected to the treadle valve 16 and air normally passes through this treadle valve to manually operated power take-off switch 22. This switch when opened permits air to pass through line 25, thence past the air-actuated electrical switch 33 whose air passage is positioned in line 25 to double check valve 35. When air passes through double check valve 35 a portion of the air passes from the valve 35 to the treadle valve 16 via line 40' to lock the valve and prevent the brake pedal from being depressed. Air however continues to pass from the air supply through line 18, the lower portion of treadle valve 16 and into line 18. The braking function is performed by air flowing through line 25, through double check valve 35 and into line 38 to the four wheel service brakes of the truck.

Air also passes out into line 40 and into air cylinder 42 through line 44, said air cylinder equipped with a piston 46 connected exteriorly with or integral with a lock-out rod 48 having a longitudinally extending elongated slot 50 interconnected to a carburetor linkage member 52 as more fully described below. The air also passes via line 54 to the power take-off unit positioned off the converter of the truck. The air under pressure services the power take-off unit employed to run the compacting assembly system.

Referring to FIG. 3, a microswitch A having terminals 57 annd 59 is positioned within the truck and is closed when the truck is in drive position. The switch is suitably constructed of a resilient electrical conductive means whereby when the gear shift lever bears against the switch the resilient switch is forced to close by the pressure of the lever itself. When the lever is not in drive position, the resiliency of the switch causes it to open. The terminal 57 is electrically connected in series with the air-actuated switch 33 positioned in the truck air lines and actuated when air passes through the air valve 22 and down to line 25 to double check valve 35. The other end of air-actuated switch 33 is connected to a suitable source of electrical power such as the truck battery. The other side of microswitch A at terminal 59 is electrically connected to a time delay circuit 60 at terminal 62 to which is connected ground 64. The other terminal 61 of the time delay circuit is connected by line 65 to relay 66 having ground 67 and in turn being electrically connected to a horn 68 also grounded at 69.

A similar microswitch B having terminals 70 and 71 is positioned within the truck and is closed when the truck is in neutral position. The switch is similarly suitably constructed of a resilient electrical conductive means whereby when the gear shift lever bears against the switch, the resilient switch is forced to close by the pressure of the lever itself. When the lever is not in neutral, the resiliency of the switch causes it to open. Thus microswitches A and B are alternatives to one another and one of the two is normally closed at all times. Terminal 70 is connected to a source of current such as the truck battery. The terminal 71 is connected to a three-way off-on-off switch 22' at terminal 3. Switch 22' is in one off-position when the valve 22 is closed. While the valve 22 is being opened by moving a suitable lever mounted in the cab of the truck a contact on the switch 22' is caused to make contact with the other terminal of the switch closing the switch. This occurs immediately with the commencement of the valve opening operation. When the valve is fully opened the contact is moved into the second "off" position opening the switch and the circuit. Suitably the lever which actuates valve 22 comprises a wire of the circuit terminating in a conductive bullet-shaped head which by movement of said lever traverses a plate only a portion of which is electrically conductive such that the conductive bullet head lies against a nonconductor when the valve is closed but moves across the conductive surface during opening of the valve. When the lever has been moved fully the bullet rests against a second non-conductive surface on the other side of the conductive surface as the first non-conductive surface. The conductive surface is in series with microswitch B as shown in FIG. 3. Thus, when valve 22 is opened the switch 22' is first closed and then re-opened. The switch 22' is manually operated and responsive to the opening of valve 22. The terminal of switch 22' is electrically connected to terminal 72 of an instant kill circuit denominated as such because it causes the engine to die by shorting the coil. Relay 72 of this circuit is electrically connected to the negative pole of the engine coil 80 through line 74 and to the relay 66 via line 75. The instant kill circuit IK is grounded as indicated at 81.

Spring depressed normally closed switch X and spring depressed normally open switch Y are positioned in series in line 83 in the order indicated and are connected at one end to terminal 61 of the time delay circuit and at the other end to a suitable source of electrical current such as the truck battery.

Figure 4:
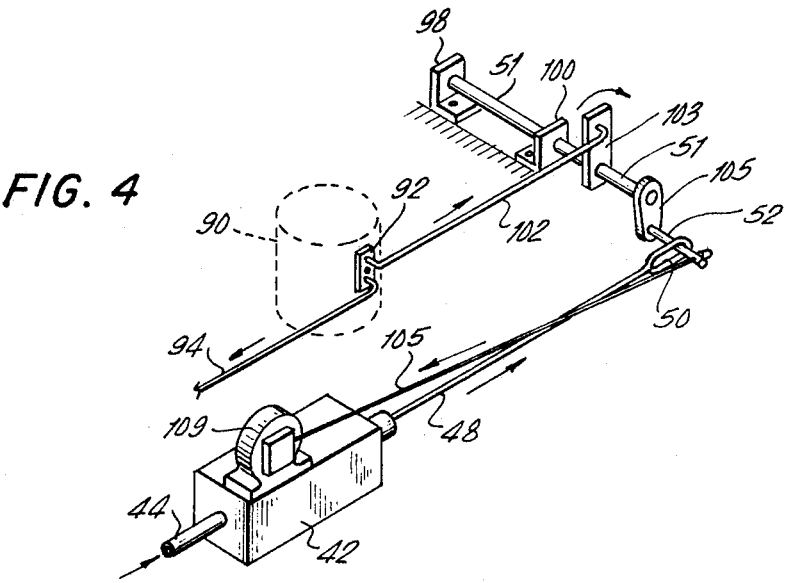
FIGURE 4 is a schematic drawing in perspective of the cycle speed limiting means in association with the carburetor linkage system of the truck pursuant to the present invention.
Figure 5:
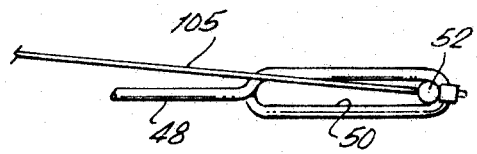
FIGURE 5 is a detail view of FIG. 4.
Figure 6:
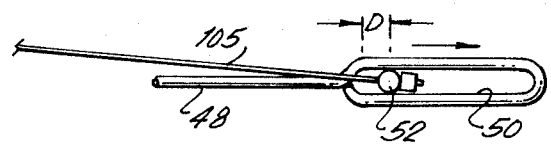
FIGURE 6 is another detail view of FIG. 4 showing arm 48 in another position.
Figure 7:
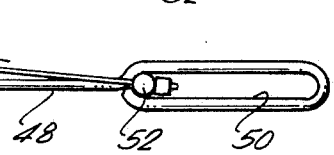
FIGURE 7 is a view similar to FIG. 4 showing the arm 52 in another position within slot 50.

Referring to FIGS. 4–7, the air cylinder 42 is mounted adjacent carburetor 90 to which is affixed the usual linkage system in the truck assembly including normally a coil spring (not shown) mounted from the back of the dashboard to the link 92, and a rod 94 extending from a mechanical assembly (not shown) responsive to the accelerator to the link 92. Forward of link 92 and carburetor 90 is a laterally running rod 51 mounted for rotation within L-shaped brackets 98 and 100 and connected to link 92 via linkage arm 102 and eccentric 103. The carburetor linkage system is responsive to the accelerator with the result that rod 51 rotates, causing rod 52 mounted eccentrically in eccentric 105 to move closer to carburetor 90 whose position is fixed. As the cycle speed of the engine is increased, the rod 52 moves rotatingly toward the firewall. The lock-out rod 48 whose position is determined only by the pressure in the cylinder engages rod 52 in the elongated slot 50 and thus serves to restrain movement of rod 52 and, in turn, the engine cycle speed. Referring to FIGS. 5, 6 and 7, FIG. 5 shows the relative position of the rod 52 and the elongated slot 50 when freedom of cycle speed is permitted. FIG. 6 shows the position of the rod 52 and slot 50 when the air cylinder is actuated and the limiting effect of the lock-out rod 48 is in effect. It should be noted that rod 52 is not nested against the left side of slot 50 simply because in most garbage trucks the manufacturer designs the truck and compacting device such that when the device is actuated by the men working in the back of the truck a rotary solenoid 109 is actuated which pulls a cable 105 a given distance to increase the engine cycle speed slightly to facilitate compaction. Thus, FIG. 7 shows the relative position of rod 52 and slot 50 during compaction, the cable 105 having pulled the rod 52 the distance D specified by the manufacturer. It should be realized, however, that the device can be adjusted for those models which do not call for a limited increase of cycle speed during compaction in which case the lock-out arm moves from the position of FIG. 5 to the position of FIG. 7. Additionally, the distance D can be varied from truck to truck as will be apparent.

Another feature of the invention lies in preventing the trunk from running and thereby preventing compaction when the latch 12 is disengaged from the seal 10. This resides in providing normally closed switch X positioned below the pivotal hinge and held closed by the pressure against body 4 by compaction element 6. The switch, a microswitch, is built into the body 4. Another microswitch Y similarly built into the body is normally open. This microswitch Y is positioned just above the lowermost junction of the compacting assembly with the truck. The switches are electrically connected to the time delay circuit as discussed above and as shown in FIGURE 3. The distance between switch X and Y is so set that switch X opens within the allotted time of the time delay circuit when the compacting element is fully pivoted to permit emptying of the collected garbage. If, however, the truck is run with the latch disengaged and the pressure against microswitch Y is such that the force of the spring (not shown) forcing the switch button outward exceeds the pressure against it, the switch closes. Thus, if neither switch X nor Y is opened within the time allotted by the time delay circuit, the circuit will be completed, the engine will be cut off due to shorting of the coil and the horn 68 will sound. This circuitry will be more fully described below with reference to other features of the invention.

With respect to the operation of the power take-off unit, the present assembly insures that the proper sequence of steps is observed. Referring to the drawings and above description, when the driver of the truck approaches the location containing the garbage, he stops the truck by applying the brake which operates the treddle valve. He shifts drive closing switch A and then engages the power take-off by actuating valve 22 in the cab of the truck permitting air to pass through line 25. This action engages the off-on-off switch 22′, air continues in line 25 by air-actuated switch 33 through double check valve 35 to the air brakes in line 38, to the air cylinder via lines 40 and 44 causing the lockout arm 48 to extend from the position shown in FIG. 5 to the position shown in FIG. 6. Since switch 33 has been actuated the time delay circuit is closed. In a preferred embodiment the time allotted by the time delay circuit is 6 seconds. Thus, if the power take-off unit remains actuated for longer than 6 seconds current will flow from terminal 61 to terminal 73 to the negative pole of the engine coil shorting the engine and protecting the converter assembly. Desirably, a relay and horn are connected to terminal 61 as shown so that the horn sounds when the unit has not properly been operated. This lets the operator know why the truck engine died. For proper operation, the operator is to shift into neutral within the alotted time after the power take-off is engaged. If this is done, microswitch A is opened and the circuit is not complete. When the compaction is finished proper operation calls for the driver to switch back into drive, then immediately disengage the power take-off. Switching back into drive closes microswitch A and sets the timer. When the power take-off unit is disengaged the air-actuated switch 33 is opened. Of course this must be done within 6 seconds or the time delay circuit is complete and the engine dies.

If the operator in beginning the compacting function engages the power take-off unit while the truck is in neutral the engine dies instantly due to the fact that microswitch B is closed by virtue of the track being in neutral and movement of the lever opening the valve 22 causes the on-phase of the off-on-off switch while the valve 22 is being opened. This instantly kills the engine because no time delay is provided thus saving the converter assembly from being damaged.

If in terminating the compacting function the driver inadvertently turns off the air to the power takeoff unit and the truck service brakes the truck also dies since this entails closing the valve 22 which in turn entails closing the three-way off-on-off switch for a moment. This instantly kills the engine in the same manner as described above.

With respect to the lockout arm assembly, when air passes through valve 22 and double check valve 35 it is directed through lines 40 and 44 into cylinder 42 causing movement of piston 46 and hence lockout arm 48 from the position shown in FIG. 5 to the position shown in FIG. 6. This allows the carburetor linkage to move only the distance D and thus limits the engine cycle speed accordingly. When compaction is begun by rearwardly located switches operated by the men working at the rear of the truck the arm 52 of the carburetor linkage assembly is moved causing the engine speed to increase. However, it is moved only the distance D due to the restraining or governing influence of arm 48 thus insuring that the truck is not raced to hasten compaction at the expense of the equipment employed therefor. When the air line is closed, the air flows out of the cylinder and the service brake lines and is removed from lines 25, 38, 40, 44 and 54 through at least one bleed line 107 shown in FIG. 2.

With respect to the rearwardly disposed safety feature of this invention preventing damage to the compacting elements when the compaction assembly is disengaged from abutting relationship with the truck body, its operation is entirely automatic. If the compaction assembly is disengaged switch Y connected to the time delay circuit is closed, the engine will die and the horn will sound after the time of the time delay circuit has elapsed. The engine will not die during normal emptying operation of the garbage because switch X is opened within the allotted time due to the relative position of the switches X and Y. It should be realized that these switches can be used in association with another timing device other than the same one employed for the purpose of preventing damage to the truck converter and its associated parts. Additionally, if a different timer is used, the time allotted by the timer can be different than the timer employed to protect the converter assembly.

It should be apparent that the present invention is capable of many modifications. For instance, if a governing assembly as shown in FIGS. 4 and 5 is not desired, it can be removed since that assembly is not essential to the present invention. Additionally, the device can be employed on trucks which do not have air brakes in which case means for actuating the brakes at the appropriate time can be incorporated into the device. Furthermore, the assembly embodying switches X and Y is not necessary for successful use of the main feature of the invention and, of course, will not be used in trucks other than garbage trucks. It will also be apparent that these other trucks can be equipped most advantageously with the devices of the present invention to minimize and eliminate transmission damage resulting from improper use of the truck and its associated functions.

From the above it is readily apparent that I have provided a significantly useful device which substantially lengthens the life of a truck by decreasing substantially the probability of engine misuse. Additionally, the mechanism provided assists in teaching a new driver how to use the truck functions, e.g. compaction assembly, properly by killing the engine and sounding a horn when the truck and power take-off units have not been operated in the proper sequence. One particular advantage of this invention is that it can be provided at a very low cost from readily available materials or components and can be assembled with a minimum labor. Thus, the investment in the device reaps dividends in substantial multiples of the initial cost considering the increased life provided.

The terms and expressions used herein have been used as terms and expression of description and not of limitation, as there is no intention, in the use of such terms and expressions, of excluding any equivalents, or portions thereof, as many modifications and departures are possible within the scope of the invention.

What is claimed is:

1. A device for preventing operation of a garbage compaction assembly disposed rearwardly against a garbage truck body, pivotally connected thereto and normally held thereagainst by mechanical latch means when said mechanical latch means have become disengaged improperly or accidentally which comprises a pair of switches mounted in said truck body and held depressed by the weight of said compaction assembly, one of which switches mounted just above the lowermost point at which said compaction assembly abuts said truck body being normally open, the other of said switches mounted just below the pivotal connection of said compaction assembly with said truck body being normally closed, said switches connected in series to a time delay circuit in turn connected to the negative pole of the coil of said truck, said switches being located relative to one another such that said compaction device can be raised within the time allotted by said delay circuit to open the upper-most switch and a source of electrical current in the circuit.

2. A device according to claim 1, wherein said switches are microswitches and are in electrical association with the time delay circuit.

References Cited

UNITED STATES PATENTS 2,703,184   3/1955   Barrett _____ 214—83.3 XR
3,220,577   11/1965  Laverne _____ 214—83.3

ALBERT J. MAKAY, Primary Examiner

U.S. Cl. X.R.

180—53